US006343754B1

(12) United States Patent
Snow

(10) Patent No.: US 6,343,754 B1
(45) Date of Patent: Feb. 5, 2002

(54) CHIPPER-SHREDDER DISCHARGE CAPTURE SYSTEM

(76) Inventor: Earl Ray Snow, 3101 N. 29-A St., Waco, TX (US) 76708

( * ) Notice: Subject to any disclaimer, the term of this patent is extended or adjusted under 35 U.S.C. 154(b) by 0 days.

(21) Appl. No.: 09/470,695

(22) Filed: Dec. 21, 1999

(51) Int. Cl.⁷ ................................................ B02C 18/22
(52) U.S. Cl. ......................... 241/100; 241/92; 241/301
(58) Field of Search ......................... 241/92, 100, 301; 206/527; 220/890, 908; 144/252.2

(56) References Cited

U.S. PATENT DOCUMENTS

| | | | |
|---|---|---|---|
| 3,861,603 A | * | 1/1975 | Lautzenheiser et al. ..... 241/100 |
| 4,824,034 A | | 4/1989 | Baker |
| 5,102,056 A | | 4/1992 | Ober |
| 5,358,189 A | | 10/1994 | Vandermolen |
| 5,381,970 A | | 1/1995 | Bold et al. |
| 5,385,308 A | | 1/1995 | Gearing et al. |
| 5,390,865 A | | 2/1995 | Vandermolen et al. |
| 5,413,287 A | | 5/1995 | Telsnig |
| 5,474,241 A | | 12/1995 | Kennedy |
| 5,707,017 A | | 1/1998 | Paolucci et al. |
| 5,860,606 A | | 1/1999 | Tiedeman et al. |

* cited by examiner

Primary Examiner—Mark Rosenbaum
(74) Attorney, Agent, or Firm—Henderson & Sturm LLP

(57) ABSTRACT

A capture system to receive, store and transport chips and debris discharged from the discharge tube of a chipper-shredder. The capture system includes a rigid housing forming an enclosure. The entry end wall of the enclosure has an opening disposed to receive the discharge tube of the chipper-shredder. An interior baffle extends from the opposite end wall at an angle of about 10° to 15° below horizontal. The baffle has an end spaced vertically above and horizontally in from the opening in the entry end wall to form a passageway to the top wall of the housing. The top wall has a solid section directly above the passageway and an open mesh section directly above the baffle. The airstream with entrained chips and debris is propelled from the discharge tube of the chipper-shredder and impacts the opposite end wall and continues up to the underside of the baffle. It is then directed back to the entry end wall upwardly to the top wall, over the upper side of the baffle, and out the open mesh section of the top wall. With each change of direction of the airstream chips and debris drop to the bottom of the housing.

16 Claims, 1 Drawing Sheet

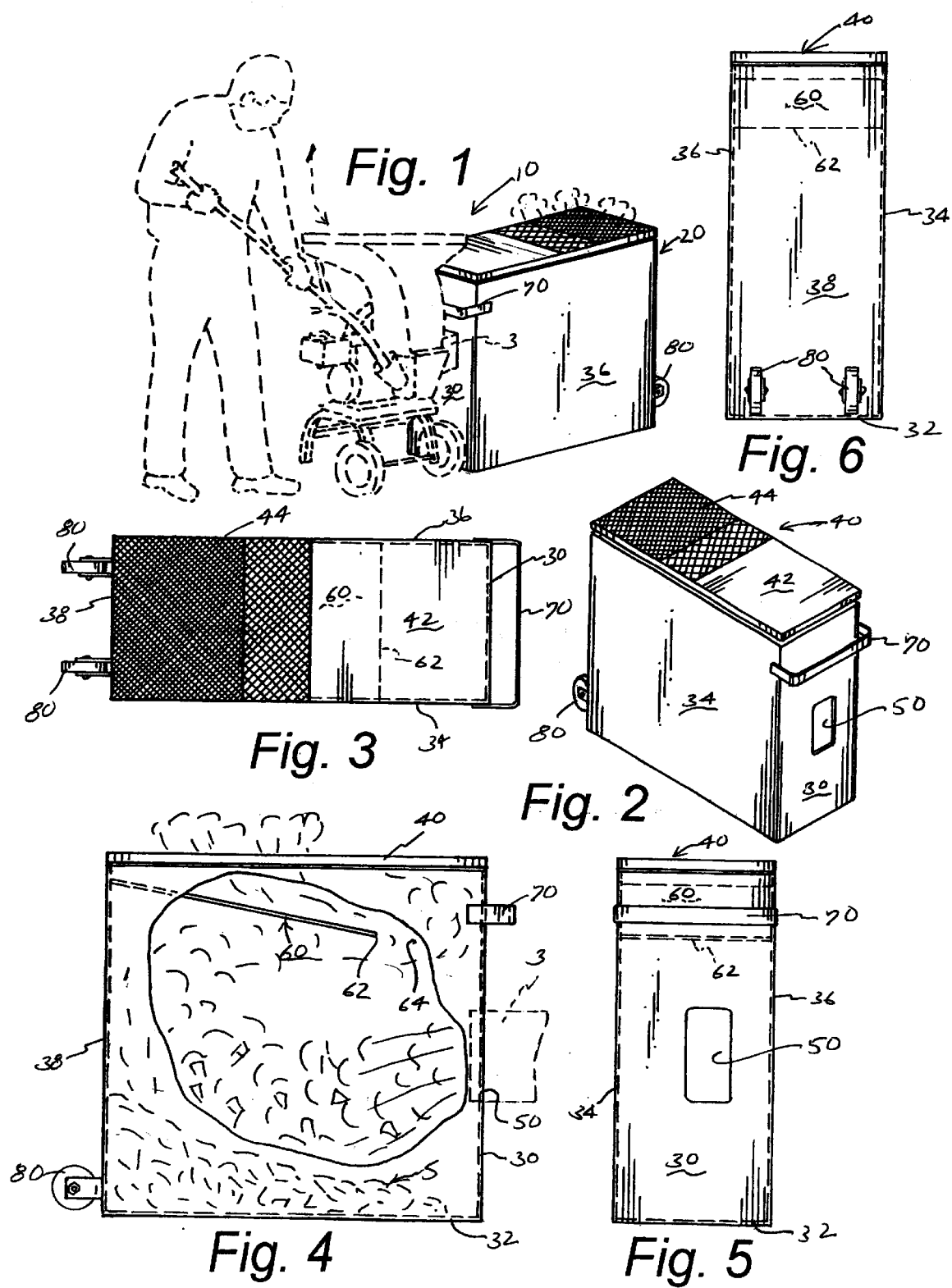

CHIPPER-SHREDDER DISCHARGE CAPTURE SYSTEM

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of lawn and garden accessories, and more particularly to a discharge capture system for chipper-shredders.

2. Description of Related Art

As can be seen by reference to the following U.S. Pat. Nos. 4,824,034; 5,102,056; 5,358,189; 5,381,970; 5,385,308; 5,390,856; 5,413,287; 5,474,241; 5,707,017; and 5,860,606 the prior art is replete with myriad and diverse chipper-shredder devices.

While all of the aforementioned prior art constructions are more than adequate for the basic purpose and function for which they have been specifically designed, they are uniformly deficient with respect to their failure to provide a simple, efficient, and practical system for recovering the chips and debris for use on gardens and flower beds.

Chips and debris discharged from chipper-shredders are presently directed into a pile to be raked up or gathered into bags attached over the discharge. These systems are both very inconvenient and inefficient.

As a consequence of the foregoing situation, there has existed a longstanding need for a new and improved chipper-shredder discharge capture system and the provision of such a construction is a stated objective of the present invention.

BRIEF SUMMARY OF THE INVENTION

Briefly stated, the present invention provides a capture system to receive, store and transport chips and debris discharged from the discharge tube of a chipper-shredder. The capture system includes a rigid housing forming an enclosure. The entry end wall of the enclosure has an opening disposed to receive the discharge tube of the chipper-shredder. An interior baffle extends from the opposite end wall at an angle of about 10° to 15° below horizontal. The baffle has an end spaced vertically above and horizontally in from the opening in the entry end wall to form a passageway to the top wall of the housing. The top wall has a solid section directly above the passageway and an open mesh section directly above the baffle. The airstream with entrained chips and debris is propelled from the discharge tube of the chipper-shredder and impacts the opposite end wall and continues up to the underside of the baffle. It is then directed back to the entry end wall upwardly to the top wall, over the upper side of the baffle, and out the open mesh section of the top wall. With each change of direction of the airstream chips and debris drop to the bottom of the housing.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 1 is a right-front perspective view of the capture system of the present invention, with an attached chipper-shredder shown in dashed lines;

FIG. 2 is a left-front perspective view of the capture system;

FIG. 3 is a top plan view thereof;

FIG. 4 is a side elevation sectional view showing the airstream flow pattern within the housing;

FIG. 5 is an entry end elevational view of the housing; and

FIG. 6 is an opposite end elevational view thereof.

DETAILED DESCRIPTION OF THE INVENTION

As can be seen by reference to the drawings, and in particularly to FIG. 1, the chipper-shredder discharge capture system that forms the basis of the present invention is designated generally by the reference number 10. The capture system (10) is adapted for use with a chipper-shredder (1) having a discharge tube (3) from which chips and debris (5) are propelled.

The capture system (10) includes a rigid housing (20) which has an entry end wall (30), a bottom wall (32), sidewalls (34, 36), an opposite end wall (38), and a top wall (40). The entry end wall (30) has an opening (50) disposed to matingly receive the discharge tube (3) of the chipper-shredder (1).

An interior baffle (60) extends down from the opposite end wall (38) at an angle of about 10° to 15° below horizontal. For ease of emptying the housing (20), the interior baffle (60) is removable. An end (62) of the baffle (60) is spaced above the opening (50) and in from the entry end wall (30) to form a passageway (64) to the top wall (40). The top wall (40) has a solid section (42) directly above the passageway (64) and an open mesh section (44) above the baffle (60).

A handle (70) is attached to and extends out from the entry end wall (30) and a pair of ground wheels (80) are attached to the opposite end wall (38) above the bottom wall (32). The top wall (40) is selectively removable to allow convenient removal of chips and debris (5) from the housing (20).

In use, the container (20) is attached to the discharge area (3) of the chipper-shredder (1). The discharge air flow carries air, chips and debris (5) into container (20), where it diffuses against the opposite wall (32), dropping a large amount of chips and debris. It continues up the opposite wall (32), until it is obstructed, and re-routed across the container (20) by a baffle (60), dropping more chips and debris. It continues up the entry wall (30) to the cover (40), where it is obstructed and re-routed dropping more chips and debris before exhausting through the open mesh (44). The chips and debris are then ready to be dumped onto a clean area, and shoveled onto flower beds, gardens, etc.

The discharge capture system (10) allows a sufficient amount of chips and debris to be gathered to make it efficient.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

What is claimed is:

1. A capture system adapted for use with a chipper-shredder having a discharge tube for discharging chips and debris therefrom, the capture system comprising:

a rigid housing including an entry end wall, a bottom wall, sidewalls, an opposite end wall, and a top wall forming a rigid generally elongated rectangular enclosure;

the entry end wall including an opening disposed to receive the discharge tube of the chipper-shredder;

an interior baffle attached to the opposite end wall and the sidewalls at a location spaced from the top of the opposite end wall and the sidewalls and extending and sloping downwardly toward the entry end wall at an angle, the baffle having an end spaced vertically above the opening in the entry end wall and spaced horizontally from the entry end wall to form a passageway;

the top wall including a solid section disposed above the passageway and an open mesh section disposed above the baffle.

2. The capture system of claim 1, wherein the baffle slopes downwardly at the angle ranging from about 10° to 15° below horizontal.

3. The capture system of claim 2, further including a hand grip attached to and extending from a top portion of the entry end wall.

4. The capture system of claim 3, further including a pair of horizontal spaced ground wheels attached to a bottom portion of the opposite end wall, the ground wheels being vertically above the bottom wall.

5. The capture system of claim 4, wherein the top wall is selectively removable to facilitate removal of chips and debris from the housing.

6. The capture system of claim 3, wherein the top wall is selectively removable to facilitate removal of chips and debris from the housing.

7. The capture system of claim 2, further including a pair of horizontal spaced ground wheels attached to a bottom portion of the opposite end wall, the ground wheels being vertically above the bottom wall.

8. The capture system of claim 7, wherein the top wall is selectively removable to facilitate removal of chips and debris from the housing.

9. The capture system of claim 2, wherein the top wall is selectively removable to facilitate removal of chips and debris from the housing.

10. The capture system of claim 1, further including a hand grip attached to and extending from a top portion of the entry end wall.

11. The capture system of claim 10, further including a pair of horizontal spaced ground wheels attached to a bottom portion of the opposite end wall, the ground wheels being vertically above the bottom wall.

12. The capture system of claim 11, wherein the top wall is selectively removable to facilitate removal of chips and debris from the housing.

13. The capture system of claim 10, wherein the top wall is selectively removable to facilitate removal of chips and debris from the housing.

14. The capture system of claim 1, further including a pair of horizontal spaced ground wheels attached to a bottom portion of the opposite end wall, the ground wheels being vertically above the bottom wall.

15. The capture system of claim 14, wherein the top wall is selectively removable to facilitate removal of chips and debris from the housing.

16. The capture system of claim 1, wherein the top wall is selectively removable to facilitate removal of chips and debris from the housing.

* * * * *